Oct. 29, 1935. N. E. NEWMAN ET AL Re. 19,743

RECORD SHEET HOLDER FOR FACILITATING DISTRIBUTION OF ACCOUNTS

Original Filed April 30, 1929 3 Sheets-Sheet 1

Filed April 30, 1929 3 Sheets-Sheet 1

Inventors
Neal Eberhart Newman
Frederick Adolph Niemann
By Henry Love Clarke Atty.

RECORD SHEET HOLDER FOR FACILITATING DISTRIBUTION OF ACCOUNTS

Original Filed April 30, 1929 3 Sheets-Sheet 2
Filed April 30, 1929 3 Sheets-Sheet 2

Inventors
Neal E. Newman
Frederick Adolph Niemann
By Henry Lee Clarke Atty.

RECORD SHEET HOLDER FOR FACILITATING DISTRIBUTION OF ACCOUNTS

Original Filed April 30, 1929 3 Sheets-Sheet 3

Reissued Oct. 29, 1929

Inventors
Neal Eberhart Newman
Frederick Adolph Newmann

By Henry Love Clarke Atty.

Reissued Oct. 29, 1935

Re. 19,743

UNITED STATES PATENT OFFICE 19,743

RECORD SHEET HOLDER FOR FACILITATING DISTRIBUTION OF ACCOUNTS

Neal Eberhart Newman, Philadelphia, Pa., and Frederick Adolph Niemann, Chicago, Ill., assignors to Felt & Tarrant Manufacturing Company, Chicago, Ill., a corporation of Illinois Original No. 1,817,640, dated August 4, 1931, Serial No. 359,310, April 30, 1929. Application for reissue August 30, 1934, Serial No. 742,792

3 Claims. (Cl. 120—33)

The invention relates in general to a device for holding record sheets for facilitating distribution of accounts and for facilitating computation from a multiplicity of separate similar record sheets, and more particularly to the provision of an arrangement of record sheets and means for maintaining the sheets in such arrangement on a support therefor together with a line guide common to all of the so arranged sheets, whereby a multiplicity of sheets each having a series of items of similar character but bearing different significant indicia may be maintained in prevously arranged relation with respect to each other and the items on all of said sheets having significant indicia in common may be selected and read with facility and precision.

Objects of the invention are to provide for removably holding a series of separate record sheets in parallel relationship on a support therefor and for maintaining in substantially parallel relation to said series of record sheets a line guide adapted for movement over all of the sheets of the series of separate sheets so that items on all of said sheets having significant indicia in common may be selected and read in rows lengthwise of the series with facility and precision merely by movement of the line guide laterally of the series; to provide for maintaining the line guide in position with respect to said support so that the guide may not be accidentally canted from its parallel position with respect to the series and will be positively held against movement lengthwise of the series; to provide a device whereby a series of sheets having two oppositely disposed parallel columns may be mounted in parallel relationship on a support during reading of items on said sheets with said line guide and with each sheet overlapping a next adjacent sheet to obscure one of the columns of each overlapped sheet and with the obscured column of each sheet of the same location relative to those of the other sheets and whereby, upon reversal of lapped portions of adjacent sheets, the position of the sheets with respect to the support may be the same but the obscured columns may be made visible and the visible columns may be obscured; to provide a device having the above noted advantages with sheets having between their respective sides a central folding line extending from top to bottom of the sheet and having two parallel columns on each portion on opposite sides of the line of fold and adapted to be first folded on said line of fold, and then removably mounted in side-by-side relation with first one portion and then the other portion visible on said support without changing the position of the respective sheets with respect to the support; and the invention has for further objects such other advantages in construction and operation as may be found to obtain in the structure and device hereinafter described and claimed.

Numerous other objects and advantages of the invention will be apparent as it is better understood from the following description, which, taken in connection with the accompanying drawings, discloses a preferred embodiment thereof.

Figure 1:
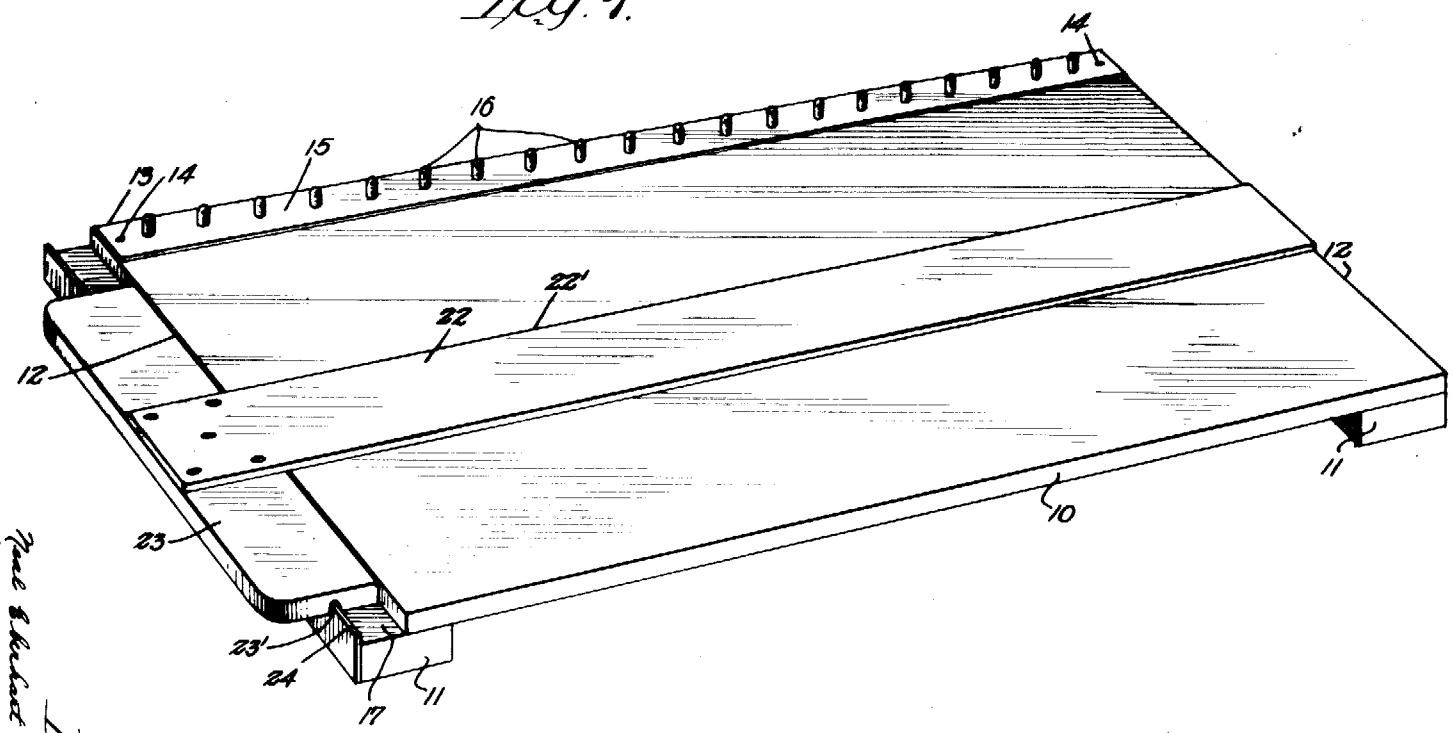
Fig. 1 is a perspective view of a device constructed in accordance with the invention for facilitating computation from a multiplicity of separate similar record sheets.
Figure 2:
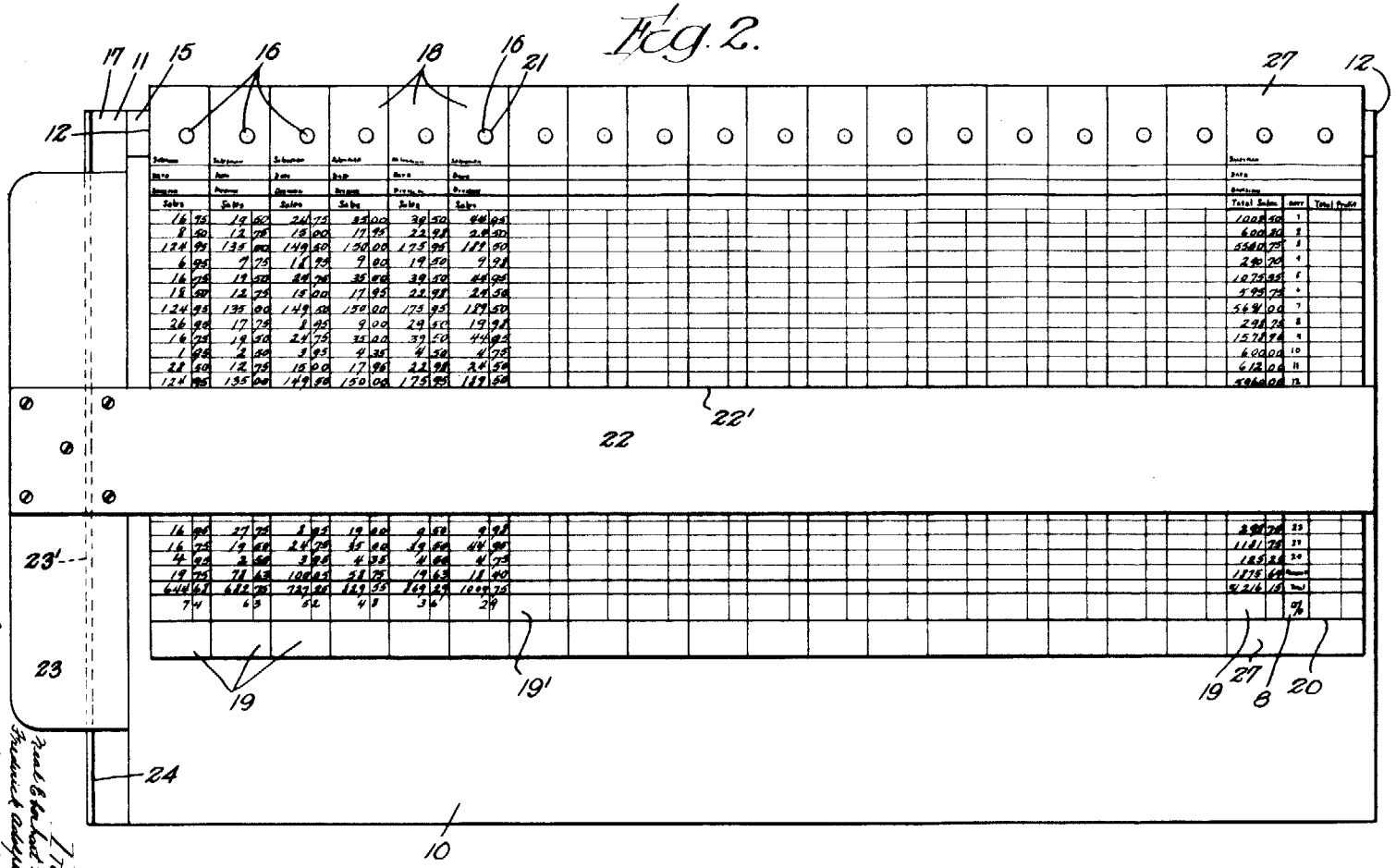
Fig. 2 is a top plan view of the same with a multiplicity of record sheets mounted thereon for purposes of computation.
Figure 3:
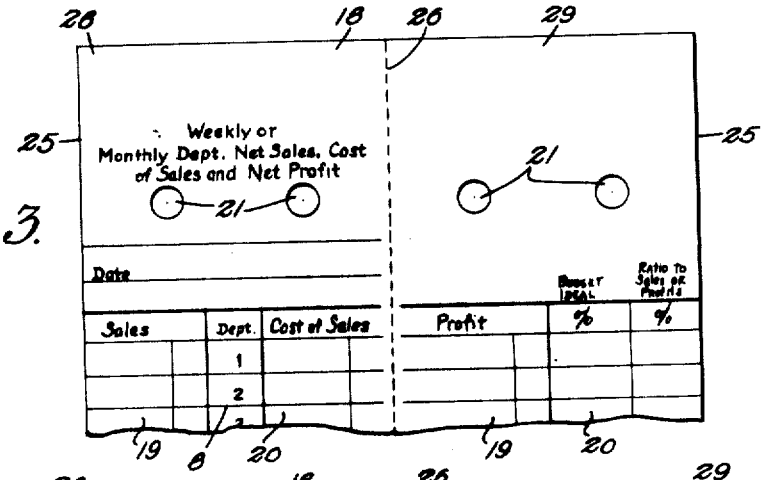
Figure 4:
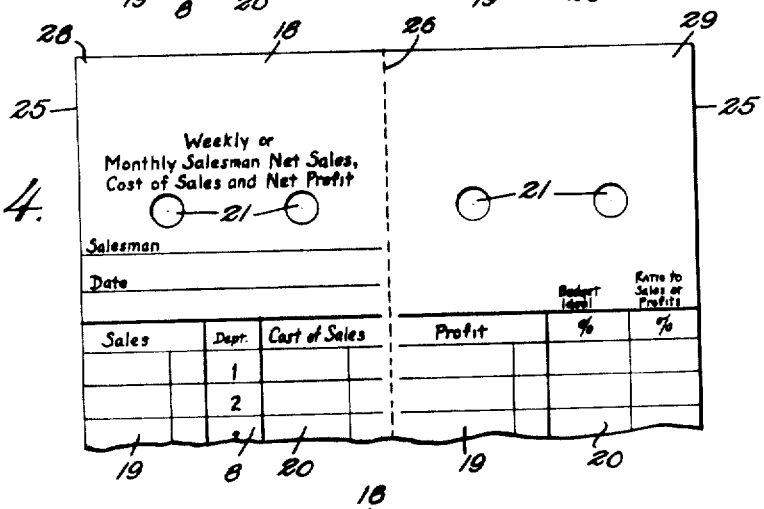
Figure 5:
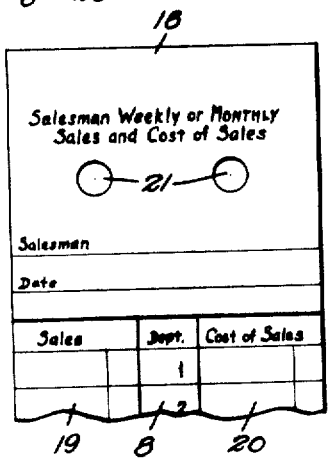

Figs. 3 to 5 are views of various kinds of record sheets adapted for use on the device of the present invention and for which the device shown in Figs. 1 and 2 is particularly adapted to facilitate the computation of items on said record sheets, Figs. 3 and 4 showing two portions of a sheet each having two parallel columns on opposite sides of a severance or folding line; and Fig. 5 showing another form of record sheet and also the size and proportions of the portions of the sheets of Figs. 3 and 4 in folded position or after being severed.

In its present embodiment, the invention is incorporated in a device for use in computation of items on a calculating machine. For convenience the ensuing description will be directed to this use of the invention. The novel features of the present invention are, however, readily susceptible of other valuable application, for example, for purposes other than computation on a calculating machine, hence the invention is not confined to the specific use and specific embodiment herein described as an illustrative example.

Referring to the drawings there is shown a horizontally elongated support or board 10 having a top adapted to maintain a series of record sheets substantially level with each other. The support 10 is provided with two base members 11 at opposite parallel ends 12 which serve to maintain the support above the surface of a desk when positioned thereon. Mounted along the upper edge 13 of the support 10 and secured thereon at 14 is a longitudinally extending pin or pale carrying member 15 having projecting upwardly therefrom a series of record sheet holding members comprising equally spaced pins or impaling members 16 arranged in a row thereon and adapted for removably holding a series of separate similar record sheets in parallel relationship, as shown in Fig. 2, on said support. One of the oppositely disposed base members 11, in the present instance the member 17, is arranged to project beyond one of the oppositely disposed parallel ends 12 which end is advantageously formed so as to be perpendicular to the row of pins or spindles 16. A plurality of separate similar record sheets 18 are provided for use on said support 10, each having its surface divided into two oppositely disposed parallel columns, 19, 20, respectively for items of similar character and having a column 8 for different significant indicia opposite each item in the columns 19, 20, and having at its upper end an impaling opening 21 above each of said columns with the impaling openings 21 of the opposite columns 19, 20, spaced apart a distance equal to the distance between the pins 16 on said support. The sheets 18 are mounted in parallel relationship so as to be arranged in a row or series on said support with the pins 16 through said impaling openings 21 and with each sheet 18 overlapping a next adjacent sheet 18 to obscure one of the columns (as shown in Fig. 2, the columns 20) of each of the overlapped sheets and with the obscured column of each sheet of the same location relative to those of all the other sheets of the series. When so mounted on the board, the impaling opening 21 above each column 21 of each sheet 18 and the impaling opening above each column 19 of an adjacent sheet are engaged by the same pin 16. With such arrangement of pins and record sheets, when computation of items from columns 19 is finished, the mere reversal of the lapped portions, by starting at one end of the row and lifting the lapped portions 19, 20 of the first two record sheets off of their pin 16 and placing the previously underlapped portion over the previously overlapped portion and then back on their pin and continuing such operation on successive lapped portions successively through the row, the respective sheets 18 may be maintained in their respective positions or locations with respect to the board 10 and to each other, and obscured columns 21 may be made visible and the visible columns 20 may be obscured. To afford selection and reading of the items on all of the sheets so mounted on said support, that have significant indicia in common, with facility and precision, a line guide 22 having a straight edge 22' adapted to extend over all of the sheets on said support 10 is slidably mounted thereon for movement over all of the sheets of the row laterally of the series of record sheet holding members 16, that is, to and from the row of pins or impaling members 16.

A member 23 is attached to and movable with said line guide 22 and engages the perpendicular edge of the support 10 that is above the base member 17 for purpose of maintaining said line guide in substantially parallel relation to the row of record-sheet holding members or series of pins 16. The member 23 is supported by the projecting portion of the base 17 and is provided, in its underside, with a groove 23', extending substantially at right angles to the line guide 22, into which a tongue 24 on the base 17 extends for the purpose of maintaining said member 23 and said line guide 22 in position with respect to the support 10 and thereby maintain the line guide 22 against canting from its parallel position with respect to the series of pins 16 and holding it against movement lengthwise of the series.

When it is desired to ascertain the aggregate amount of the sales made in a period of time, for instance, one month, by a plurality of salesmen for each of several departments, the aggregate cost of such sales and the aggregate profit therefrom, and also, for instance, the total amount of the sales made by all such salesmen of all said departments, the total cost of said sales and the total profit therefrom, record sheets, such as are shown in Figs. 3 to 5, are provided having in the mediate column 8 the department numbers arranged in predetermined order and having the sales for the respective departments noted in the column 19 and the cost of such sales noted in the column 20 directly opposite the indicia that signifies the department for which such sales were made. Such record sheets of all salesmen are then mounted on the support 10, as hereinabove described, and a total record sheet 27 having a mediate column 8 for the significant indicia and two oppositely disposed parallel columns, 19, for sales, and 20, for total profit, is mounted on the support 10 at one end of the series. The line guide is then drawn to beneath the first of the indicia in the column 8 of total record sheet 27, and the amounts of sales appearing above the guide read in a row across the series and accumulated on a calculating machine and the total of such reading marked in the column 19 opposite the first of the indicia in column 8. Then the line guide is slid laterally of the series to beneath the second of the indicia in the column 8 of the total record sheet and a similar reading, calculation and notation made, and so on throughout all of the indicia in the column 8 of the total record sheet 27. After all such readings, calculations and total notations are made the columns 19 of all of the several sheets are read and calculated individually, and the totals noted beneath each of the several columns, thus indicating the total amount of the sales of each salesman and the aggregate total of all salesmen in column 19 of sheet 27. After such computation the percentages may be computed and noted in the last row 19'. Thereafter the lapped portions 19, 20 of the adjacent sheets are reversed as hereinabove described and a similar reading and calculation of the costs of sales made for each department, but instead of noting the total costs opposite the indicia for the respective departments in the column 20, the total costs are subtracted on a calculating machine and the difference, if there be a profit, is noted in the column 20.

As shown in Figs. 3 and 4, the record sheets each have between their two opposite sides 25 a central folding or severance line 26 extending from top to bottom of the sheet and have the surface of each of the portions on opposite sides of fold 26 divided into two oppositely disposed parallel columns 19, 20. Each sheet, as shown, has parallel horizontal lines extending through all parallel columns and through the mediate column 8 between two of the columns 19, 20 on one side of the line 26 for markings of significant indicia.

When it is desired to make computations from a multiplicity of such record sheets and to maintain sheets in the same position relative to each other and to the support 10, they are first folded on the line 26 and then mounted on the support 10 in the manner hereinbefore described with first one side portion 28 visible and then, after computation from items in both columns 19 and 20 by reversal of the lapped portions 19 and 20 of adjacent sheets as hereinbefore set forth, with the other side portion 29 visible on the support 10. Of course, should the portions 28 and 29 be severed instead of folded on the line 26, the portions 28 and 29 may be mounted on the same pins with the face of portion 29 to the back of portion 28, or vice versa, and after computation of portions 28 is finished the positions of portions 28 and 29 may be reversed with respect to each other, that is, the face of portion 28 to the back of portion 29, and in this manner the position of the sheets with respect to each other and to the support 10 is maintained with certainty. Or, after being severed, if it is desired not to mount the portions 28, 29, face to back as described, the portions 28 only may be mounted and, after computations have been made therefrom, then removed from the support and the portions 29 subsequently mounted on the support for computation, with the results of the computations of respective significant indicia on each portion 28, 29, maintained in proper order with respect to the results of the computations of the respective significant indicia on each portion 28, 29, maintained in proper order with respect to the results of the computations of the respective significant indicia on the other.

Referring to Fig. 2, it will readily appear that the pins 16 will not of themselves positively maintain the record sheets in the desired position on the backing support 10. The rigid line guide or straightedge member 22, however, has the additional function of aiding in accomplishing this result by preventing movement of the sheets off of the pins when it is in its normal or working position. Thus, as can be seen from Fig. 2, the record sheets are held at their top ends by means of the pins 16 in the desired position; and, as the rigid line guide 22 is moved up and down across the bodies of the several sheets, it not only assures the accurate presentation of cross columns, but in co-operation with the end holding devices it prevents movement of the sheets, and especially of those portions of the sheets from which the adding is being accomplished.

From the foregoing description, and as clearly appears from Fig. 2, it is apparent that the device of the invention provides in a simple manner for selection in rows and reading at a glance of items having the same significant indicia from a multiplicity of sheets each having a series of items of similar character but bearing different significant indicia and arranged in side-by-side relation, merely by movement of a line guide over all the sheets of the series in a direction laterally thereof.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A record sheet holder, comprising a backing support adapted to receive a multiplicity of strips of paper having columns of numerical data, a row of pins carried by said backing support for receiving the ends of said strips to hold them in predetermined equally spaced shingled relationship across said backing support with columns exposed, and a rigid line guide arrangeable across said strips and movable lengthwise thereof to facilitate lateral reading of items across said plurality of strips.

2. In a record sheet holder, a backing support for a plurality of strips of paper having columns of numerical data, a row of pins carried by said backing support for engaging the ends of said strips of paper to position them in predetermined equally spaced shingled relationship across said backing support with columns exposed, and a straightedge line guide associated with said backing support and extending transversely across said columns to co-operate with said pins to maintain said strips in a desired position.

3. In a record sheet holder, a backing support for a plurality of strips of paper having columns of numerical data, a row of pins associated with said backing support for engaging the ends of said strips of paper to hold them in predetermined equally spaced overlapping relationship on said backing support with columns exposed, and a straightedge member associated with said backing support and extending across said strips of paper to facilitate lateral reading and extension of items across said plurality of strips, said straightedge member co-operating with said pins to hold said strips in predetermined equally spaced and overlapping relation on said backing support to expose desired columns of data.

NEAL EBERHART NEWMAN.
FREDERICK A. NIEMANN.